US011453600B2

(12) United States Patent
Balasundaram et al.

(10) Patent No.: US 11,453,600 B2
(45) Date of Patent: Sep. 27, 2022

(54) METHOD OF MAKING HYDROCARBON SOLUBLE METAL COMPOSITIONS

(71) Applicant: Indian Oil Corporation Limited, Mumbai (IN)

(72) Inventors: Murugan Balasundaram, Haryana (IN); Kochappilly Ouseph Xavier, Haryana (IN); Alex Cheru Pulikottil, Haryana (IN); Madhusudan Sau, Haryana (IN); Sanjiv Kumar Mazumdar, Haryana (IN); Sankara Sri Venkata Ramakumar, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 719 days.

(21) Appl. No.: 16/440,168

(22) Filed: Jun. 13, 2019

(65) Prior Publication Data

US 2019/0382279 A1    Dec. 19, 2019

(30) Foreign Application Priority Data

Jun. 16, 2018 (IN) .............................. 201821022592

(51) Int. Cl.
*C01G 41/00* (2006.01)
*C01G 31/00* (2006.01)
*C01G 39/00* (2006.01)

(52) U.S. Cl.
CPC ............. *C01G 41/00* (2013.01); *C01G 31/00* (2013.01); *C01G 39/00* (2013.01)

(58) Field of Classification Search
None
See application file for complete search history.

(56) References Cited

U.S. PATENT DOCUMENTS

| 2,285,853 | A | 6/1942 | Downing et al. |
| 2,285,854 | A | 6/1942 | Downing et al. |
| 2,391,631 | A | 12/1945 | Kingerley, Jr. |
| 3,657,123 | A | 4/1972 | Stram |
| 4,693,839 | A | 9/1987 | Kuwamoto et al. |
| 4,752,416 | A | 6/1988 | Scharf et al. |
| 4,769,178 | A | 9/1988 | Kenmochi et al. |
| 6,232,276 | B1 | 5/2001 | Stiefel et al. |
| 8,445,399 | B2 | 5/2013 | Wu et al. |
| 9,255,229 | B2 | 2/2016 | Borremans et al. |
| 2009/0173665 | A1* | 7/2009 | Zhou .................... C07F 15/065 556/42 |
| 2009/0203860 | A1* | 8/2009 | Bergbreiter ............. C08L 65/00 526/171 |
| 2017/0144142 | A1* | 5/2017 | Balasundaram ......... B01J 31/22 |

FOREIGN PATENT DOCUMENTS

| CN | 1335230 A | 2/2002 |
| CN | 103980320 A | 8/2014 |
| EP | 0146140 A2 | 6/1985 |
| WO | WO-88/03144 A1 | 5/1988 |

* cited by examiner

*Primary Examiner* — Daniel S Gatewood
(74) *Attorney, Agent, or Firm* — Blank Rome LLP

(57) ABSTRACT

The present invention relates to a method of making of hydrocarbon soluble metal composition comprising of one or more metals of group VIB of the periodic table, wherein the metal having 4+ oxidation state predominantly forms highly active metal sulfide catalyst for hydro-conversion of heavy oil feedstocks in liquid phase. More particularly, present invention relates to a hydrocarbon soluble metal composition comprising of reaction products of a metal source, a lipophilic phenolic acid, a surfactant and an organophosphorus compound. The present invention also provides a one-pot process for preparation of the hydrocarbon soluble metal composition comprising reacting a metal source, a lipophilic phenolic acid, a surfactant, an organophosphorus compound and water to obtain a reaction product and drying the reaction product to obtain the hydrocarbon soluble metal composition.

11 Claims, No Drawings

METHOD OF MAKING HYDROCARBON SOLUBLE METAL COMPOSITIONS

RELATED APPLICATION

This application claims the benefit of Indian Patent Application No. 201821021592, filed on Jun. 16, 2018, The entire content of that application is hereby incorporated by reference.

FIELD OF THE INVENTION

The present invention describes a method of making hydrocarbon soluble metal composition as catalysts for heavy oil hydroconversion. More particularly, present invention relates to a hydrocarbon soluble metal composition comprising of reaction products of a metal source, a lipophilic phenolic acid, a surfactant and an organophosphorus compound.

BACKGROUND OF TILE INVENTION

Heavy oil conversion technologies are challenging because, if not managed properly, high molecular weight compounds such as asphaltenes, maltenes and resins can self-associate or flocculate to form larger molecules and generate a mesophase, which can precipitate out of solution to form coke and reduce the efficiency of heavy oil conversion technologies. As a result, the common refinery processes like Resid FCC and fixed/ebullated bed hydroprocessing technologies used for processing petroleum residue are limited by the heaviness of feedstock. However, the slurry hydroconversion process, wherein the catalyst is finely dispersed in the liquid hydrocarbon, is attractive for processing broad range of heavier feedstocks. In such processes, the degree of dispersion of the catalyst in the heavy oil strongly influences the liquid and coke yield patterns. Although high levels of catalyst dispersion can be achieved by adopting efficient process conditions, the use of oil-soluble catalyst precursors seems to be the most promising approach to achieve a good dispersion of the catalyst species in the complex hydrocarbon matrix.

For the hydroconversion of heavy petroleum feedstocks, the use of hydrocarbon soluble metal compounds for the enhancement of the liquid yield and reduction of coke formation has been investigated extensively. A number of oil-soluble metal catalyst used in hydroconversion process and their method of preparation are reported in various patents.

From the commercial perspective, it is still required to improve the performance of these catalysts in terms of activity, selectivity and cost. The efficiency of hydrocracking heavy oils using oil soluble metal compounds can further be improved by increase in the percent of metal content of catalyst precursor while still maintaining or improving solubility. Both the concentration and dispersion of the metal(s) in the heavy oil fraction decides the performance of such catalyst systems. Even small improvements in performance will have a significant benefit to cost of overall process due to the increase in output and/or the reduced use of the catalyst.

In an alternative approach, the reactivity of the oil soluble catalyst precursor can be improved by designing oil soluble metal compositions with reduced valencies of metal i.e., U.S. Pat. No. 8,445,399 B2 discloses a process wherein the molybdenum is reduced from +5 valence state to a oxidation state less than +4, so as to have a average oxidation state of +4 and such species is reported to have increased activity for the hydroconversions. However, preparation of such species requires the use of hydrogen as the reducing agent at an elevated temperature of about 200° C. and also the process requires the use of inert conditions.

Phosphorus containing oil soluble compounds such as molybdenum dithiophosphates (Mo-DTP) are available in the literature. However, these systems exhibit poor activity in the hydroprocessing of heavy hydrocarbons such as vacuum residue (Fuel Chemistry Division Preprints 2003, 48(1) 94). The reason for poor activity is reported to be the difficulty of Mo-DTP to get transformed quantitatively in to single layered $MoS_2$ species compared to molybdenum dithiocarbamate (Mo-DTC) in VR (Fuel 2002, 81, 1.515-1520).

Oil soluble metal compositions with P compounds have been reported for lubricant applications. WO 88/03144 describes method of making oil soluble metal salts using phosphoric acid esters useful in lubricating oils, fuels, functional fluids, aqueous systems and have utility as high torque extreme pressure agent. U.S. Pat. No. 6,232,276B1 discloses phosphorus containing oil soluble trinuclear molybdenum compositions and employed as a multifunctional additive in lubricating oils. Some of the relevant patent literatures are U.S. Pat. Nos. 2,391,631, 4,693,839, 2,285,853, 4,769,178, 4,752,416, and 2,285,854.

EP-A-146140B1 describes the use of acidic phosphoric acid monoesters as lubricating component. U.S. Pat. No. 3,657,123 describes amine salts of phosphoric esters, but also the use of acidic phosphoric esters as EP components in water-miscible lubricants. CN 1,335,320A discloses a synthesis method for diisooctyl molybdenum dithiophosphate, wherein the said compound is used as an additive in lubricating oils. The phosphorus containing oil soluble molybdenum compositions described in these prior arts uses expensive ligands and also has similar chemical structure as that of the Mo-DTP which is reported to have only poor performance as catalyst precursor in the hydro-conversion of heavy oils. The complete conversion of these precursors to active $MoS_2$ is unlikely due to the existence of more stable ligands.

CN 103,980,320A discloses a method of making phosphorus containing oil soluble molybdenum-based catalyst precursor and employing as catalysts for heavy oil hydrocracking. The process uses the solid $P_2S_5$ as a phosphorus agent to form the oil soluble molybdenum complex. The process is limited due to the formation of by-products like $H_2S$ gas and presence of un-reacted $P_2S_5$.

U.S. Pat. No. 9,255,229 B2 discloses the use of metallocene based systems like bis(cyclopentadienyl)molybdenum dichloride coordinated with phosphine based ligands for the hydroconversion of heavy hydrocarbonaceous feedstock. However, such catalyst precursor is not economically viable.

U.S. Patent No. 20090203860A1 discloses a method of making non-polar phase soluble ruthenium and triphenylphosphine based metathesis catalyst. However, the method adopts a very cumbersome route for commercial application.

SUMMARY OF THE INVENTION

In the present invention, a metal composition having metal partly in reduced oxidation of +4 is prepared through a chemical route wherein the metal species is also coordinated with P containing ligand. Although prior art reported that the metal species present in reduced oxidation state leads to the formation of more active sulfide phases, the method of preparation followed in prior arts for synthesis of metal compositions with reduced valance state includes high temperature reduction steps with hydrogen gas, which is commercially difficult to practice. Further, the reduction of valance state of metal to lower oxidation state has not been explored in any of the prior arts, wherein the phosphorus based compounds are used.

The present invention discloses one-pot synthesis of oil/hydrocarbon soluble metal composition comprising of phosphorous containing ligand molecule/organophosphorus compounds in addition to a lipophilic phenolic acids and surfactant molecule. The addition of P molecule in the metal composition results in the formation of more active metal species in the reduced oxidation state, and thereby enables enhancement of catalytic activity. The method of preparation according to the current invention also enables incorporating promoter atoms such as P in the catalyst system in order to enhance activity of the catalyst.

Accordingly, the present invention provides a hydrocarbon soluble metal composition comprising of reaction products of a metal source, a lipophilic phenolic acid, a surfactant and an organophosphorus compound and having formula:

$$ML_xQ_yP_z,$$

wherein:

M is a metal source;

L is a ligand selected from the group containing lipophilic phenolic acid;

x ranges from 0.5 to 2;

Q is a surfactant selected from the group containing quaternary ammonium phosphonium salt and combination thereof;

y ranges from 0.5 to 1.5;

P is an organophosphorus compound; and z ranges from 0.5 to 1.5.

The present invention also provides a one-pot process for preparation of a hydrocarbon soluble metal composition comprising reacting a metal source, a lipophilic phenolic acid, a surfactant, an organophosphorus compound and water to obtain a reaction product and drying the reaction product to obtain the hydrocarbon soluble metal composition.

In one of the feature of the present invention, the one-pot process for preparation of a hydrocarbon soluble metal composition comprising:

(a) reacting the lipophilic phenolic acid and the metal source in presence of water to form a complex;

(b) reacting the complex with the surfactant in a hydrocarbon medium at a temperature between 50 to 150° C. for a period in the range of 0.5 hour to 6 hours to form a reaction product;

(c) separating an organic phase and aqueous phase of the reaction product and separating the water from the reaction product and drying the reaction product using a solid drying agent to obtain a dried product; and (d) then reacting the dried product with the organophosphorus compound at a temperature between 25 to 50° C. to obtain the hydrocarbon soluble metal composition.

OBJECTIVES OF THE INVENTION

Primary objective of the present invention is to provide a chemical route for the preparation of hydrocarbon soluble metal composition comprising of a phosphorous containing ligand molecule in addition to a lipophilic phenolic acids and surfactant molecule and thereby the metal species are present in reduced oxidation state which in turn forms more active sulfide phases for the hydroconversion of heavier feedstocks.

The further objective of the present invention is to provide a one-pot synthesis route for oil soluble metal composition with metals in the reduced valance states and does not require any unwieldy process like hydrogen reduction at high temperatures in order to make the metal components to be active.

Another objective of the present invention is to provide hydrocarbon soluble metal compositions that possess good oil solubility and shelf-life of 2 years with high metal concentration of maximum 20 wt % as metal oxide.

DETAILED DESCRIPTION OF THE INVENTION

Accordingly, the present invention is directed to a hydrocarbon soluble metal composition comprising of reaction products of a metal source, a lipophilic phenolic acid, a surfactant and an organophosphorus compound and is having formula:

$$ML_xQ_yP_z,$$

wherein:

M is a metal source;

L is a ligand selected from the group containing lipophilic phenolic acid;

x ranges from 0.5 to 2;

Q is a surfactant selected from the group containing quaternary ammonium, phosphonium salt and combination thereof;

y ranges from 0.5 to 1.5;

P is an organophosphorus compound; and z ranges from 0.5 to 1.5.

In one of the feature of the present invention, the "P" in the formula $ML_xQ_yP_z$ is a phosphorus containing ligand. The "P" is independent from other ligand with sufficient number of carbon atoms to render the compound soluble in oil.

The source of metal or metal source is a water soluble salt of the metal ion capable of reacting with the reaction product of the lipophilic phenolic acid, surfactants and organophosphorus compound. Suitable metal salts include salts of metal selected from the group consisting of vanadium (V), molybdenum (Mo), tungsten (W) and combinations thereof. In one of the feature of the present invention, the metal is present in reduced oxidation state of 4+. In another feature of the present invention, hydrocarbon soluble metal composition having metal partly in reduced oxidation of +4 is prepared through a chemical route wherein the metal species is also coordinated with P containing ligand.

In one of the feature of the present invention, the metal source is molybdenum, tungsten, vanadium and combination thereof.

The exemplary source of V, Mo and W alkali, alkali-earth and ammonium salt of each metal such as ammonium vanadate, sodium vanadate, ammonium molybdate, sodium molybdate, potassium molybdate, ammonium tungstate, sodium tungstate and mixtures thereof.

In the preferred feature of the present invention, ammonium and/or sodium salt of the metals ions are used.

The lipophilic phenolic acid analog or lipophilic phenolic acid is selected from the group consisting of salicylic acid, 1-hydroxy-2-naphthoic acid, 1-hydroxy-2-anthroic acid, 2-hydroxy-3-naphthoic acid, 2-hydroxy-3-anthroic acid, 4-hydroxyisophthalic acid, 2,6-dihydroxybenzoic acid, 5-nitrosalicylic acid, 5-iodosalicylic acid, 5-bromosalicylic acid, 5-iodosalicylic acid, 5-fluorosalicylic acid, 3-chlorosalicylic acid, 4-chlorosalicylic acid, 5-chlorosalicylic acid, and combinations thereof. Most preferably, the lipophilic phenolic acid analog is selected from the group consisting of salicylic acid, 1-hydroxy-2-naphthoic acid, 1-hydroxy-2-anthroic acid, 2-hydroxy-3-naphthoic acid, 2-hydroxy-3-anthroic acid, and combinations thereof.

The surfactants suitable for use in the present invention include and not limited to monoalkyltrimethylammonium salt, dialkyldimethylammonium salt and trialkylmonomethylammonium salt, cetylpyridinium salt, hexamethylenetetramine chloroallyl chloride, tetraoctylammonium bromide, hexadecyltributylphosphonium bromide, tetraphenylphosphonium chloride and combinations thereof.

The examples of monoalkyltrimethylammonium salts include but not limited to cetyltrimethyl ammonium bromide, cetyltrimethyl ammonium chloride, cetyltrimethyl ammonium iodide, cetyltrimethyl ammonium nitrate, cetyltrimethyl ammonium sulfate, cetyltrimethyl ammonium salicylate.

The examples of dialkyldimethylammonium salts include but not limited to cetyldimethylbenzylammonium chloride, cetyldimethylbenzylammonium bromide, cetyldimethylbenzylammonium iodide, cetyldimethylbenzylammonium sulfate, cetyldimethylbenzylammonium nitrate, cetyldimethylbenzylammonium salicylate, benzethonium chloride, benzododecinium bromide, didecyldimethylammonium chloride, dimethyldioctadecylammonium chloride, dodecyldimethylbenzylammonium chloride, domiphen bromide, polyquaternium, stearalkonium chloride, thonzonium bromide, The examples of trialkylmonomethylammonium salts include but not limited to methyltrioctylammonium chloride and methyltriphenoxyphosphonium iodide.

The examples of cetylpyridinium salts include but not limited to cetylpyridinium chloride, cetylpyridinium bromide, cetylpyridinium iodide, cetylpyridinium nitrate, cetylpyridinium sulfate, cetylpyridinium salicylate.

Other surfactants that are suitable for use in the present invention include hexamethylenetetramine chloroallyl chloride, tetraoctylammonium bromide, hexadecyltributylphosphonium bromide and tetraphenylphosphonium chloride.

More preferably the surfactant is selected from the group consisting of cetyltrimethyl ammonium bromide, cetyltrimethyl ammonium chloride, cetyltrimethyl ammonium iodide, cetyltrimethyl ammonium nitrate, cetyltrimethyl ammonium sulfate, cetyltrimethyl ammonium salicylate, cetyldimethylbenzylammonium chloride, cetyldimethylbenzylammonium bromide, cetyldimethylbenzylammonium iodide, cetyldimethylbenzylammonium sulfate, cetyldimethylbenzylammonium nitrate, cetyldimethylbenzylammonium salicylate, cetylpyridinium chloride, cetylpyridinium bromide, cetylpyridinium iodide, cetylpyridinium nitrate, cetylpyridinium sulfate, cetylpyridinium salicylate, methyltrioctylammonium chloride, didecyldimethylammonium chloride, dodecyldimethylbenzylammonium chloride, dimethyldioctadecylammonium chloride, hexadecyltributylphosphonium bromide, tetraphenylphosphonium chloride and methyltriphenoxyphosphonium iodide.

Most preferably the surfactant is selected from the group consisting of cetyltrimethyl ammonium bromide, cetyltrimethyl ammonium chloride, hexadecyltributylphosphonium bromide and tetraphenylphosphonium chloride.

The organophosphorus compounds that are suitable for the present invention is selected from the group consisting of the organic compound containing a phosphorus atom include compounds such as alkyl, aryl and alkyl aryl phosphines, phosphine oxides, phosphinites, phosphonites, phosphinates, phosphites, phosphonates, phosphates and Phosphoramidates.

In one of the feature of the present invention, the organophosphorus compound is selected from the group consisting of organophosphine, organophosphine oxide, organophosphinite, organophosphonite, organophosphinate, organophosphite, organophosphonate, organophosphate and organophosphoramidate, organic trithiophosphites, organic thiophosphates, triphenylphosphine sulfide, triphenylphosphine selenide, triphenylphosphine phenylimide, and combinations thereof.

Examples of the organophosphines represented by $(R)_3P$ include tributylphosphine, trihexylphosphine, trioctylphosphine, tri(2-ethylhexyl) phosphine, trinonylphosphine, tridecylphosphine, trilaurylphosphine, trimyristylphosphine, tripalmitylphosphine, tristearylphosphine, trioleylphosphine, triphenylphosphine, tricresylphosphine and the like.

Examples of the organophosphine oxides represented by $(R)_3P=O$ include tributylphosphine oxide, trihexylphosphine oxide, trioctylphosphine oxide, tri (2-ethylhexyl) phosphine oxide, trinonylphosphine oxide, tridecylphosphine oxide, trilaurylphosphine oxide, trimyristylphosphine oxide, tripalmethylphosphine oxide, tristearylphosphine oxide, trioleylphosphine oxide, triphenyloxide, tricresylphosphine oxide and the like.

Examples of organophosphites represented by $(RO)_3P$ include mono-, di- or tributyl phosphite (hereinafter "mono, di or tri" as "mono/di/tri-"), mono/di/trihexyl phosphite, mono/di/trioctyl phosphite, mono/di/tri (2-ethylhexyl) phosphite, mono/di/trinonyl phosphite, mono/di/tridecyl phosphite, mono/di/trilauryl phosphite, mono/di/trimyristyl phosphite, mono/di/tripalmityl phosphite, mono/di/tristearyl phosphite, mono/di/trioleyl phosphite, mono/di/triphenyl phosphite, mono/di/tricresyl phosphite, etc. Other phosphites include pentaerythritol diphosphite, pentaerythritol tetraphosphite, alkylidene bisphosphite and the like.

Examples of the organophosphates represented by $(RO)_3P=O$ include mono/di/tri-butyl phosphate, mono/di/trihexyl phosphate, mono/di/trioctyl phosphate, mono/di/tri (2-ethylhexyl) phosphate, mono/di/trinonyl phosphate, mono/di/tridecyl phosphate, mono/di/trilauryl phosphate, mono/di/trimyristyl phosphate, mono/di/tripalmityl phosphate, mono/di/tristearyl phosphate, mono/di/trioleyl phosphate, mono/di/triphenyl phosphate. They may include a phosphate having a polyoxyalkylene group, i.e., phosphate of lauryl alcohol-ethylene oxide and/or propylene oxide adducts, and the like.

Examples of the compound containing a phosphorus atom and a sulfur atom include trithiophosphite, thiophosphate and the like.

Examples of the organic trithiophosphites represented by $(RS)_3P$ and the like include mono/di/tributyl trithiophosphite, mono/di/trihexyl trithiophosphite, mono/di/trioctyl trithiophosphite, mono/di/tri (2-ethylhexyl) trithiophosphite, mono/di/trinonyltrithiophosphite, mono/di/tridecyltrithiophosphite, mono/di/trilauryltrithiophosphite, mono/di/trimyristyltrithiophosphite, mono/di/tripalmityltrithiophosphite, mono/di/tristearyltrithiophosphite, mono/di/trioleyltrithiophosphite, mono/di/triphenyl trithiophosphite, mono/di/tricresyl trithiophosphite and the like.

Examples of the organic thiophosphates represented by $(RO)_3P=S$ include mono/di/tributylthiophosphate, mono/di/trihexylthiophosphate, mono/di/trioctylthiophosphate, mono/di/tri (2-ethylhexyl) thiophosphate, mono/di/trinonylthiophosphate, mono/di/tridecylthiophosphate, mono/di/trilaurylthiophosphate, mono/di/trimyristylthiophosphate, mono/di/tripalmitylthiophosphate, mono/di/tristearylthiophosphate, mono/di/trioleylthiophosphate, mono/di/triphenylthiophosphate, mono/di/tricresyl thiophosphate and the like.

More preferably the organophosphorus compound is selected from the group consisting of triphenylphosphine also known as triphenylphosphane, triphenyl phosphate, triphenyl phosphite, triphenylphosphine oxide, triphenylphosphine sulfide, triphenylphosphine selenide, triphenylphosphine phenylimide.

The hydrocarbon soluble metal phosphide of the present invention can be synthesized as follows:

The lipophilic phenolic acid(s) and the metal source are reacted in the presence of water. The complex is then reacted with the surfactant(s) and organophosphorus compound(s) in a hydrocarbon medium at temperatures between 50 to 150° C. The preferred reaction temperature is between 75 and 125° C. The reaction times are typically in the range from 0.5 hour to 6 hours. The hydrocarbon in these reactions acts as solvents and is chosen in such a way that it does not react with the lipophilic phenolic acid or surfactant. The preferred hydrocarbons are benzene, toluene, xylenes, heptane, decane, dodecane, and petroleum fractions like kerosene, light cycle oils, and various naphthenic, paraffinic and synthetic diluent oils. The amount of solvent used is not critical but is kept to a minimum in order to achieve higher effective metal concentrations in the finished product. The as-formed product is separated from water, dried using a solid drying agent like anhydrous sodium sulfate and then reacting the dried product with organophosphorus compound(s) at temperatures between 25 to 50° C.

In an embodiment, the entire process can be performed in aerobic conditions.

In an embodiment, the lipophilic phenolic acid(s), the surfactant(s), the metal source(s), hydrocarbon and water medium can all be charged to the reactor at one time. After the reaction, the precipitant is separated and mixed with organophosphorus compound(s).

In one embodiment, the lipophilic phenolic acid(s), the surfactant(s) and hydrocarbon are reacted to form a composition. This composition is then reacted with the metal source in the presence of water. The as-formed product is separated from water, dried using a solid drying agent like anhydrous sodium sulfate and then reacting the dried product with organophosphorus compound(s).

In another embodiment, the lipophilic phenolic acid(s) and the metal source(s) can be reacted to form a complex. The complex is then reacted with the surfactant(s) and organophosphorus compound(s) in a reaction medium.

In another embodiment, the surfactant(s) and the metal source(s) can be reacted to form a mixture. The salt/metal mixture is then reacted with the lipophilic phenolic acid(s) and organophosphorus compound(s).

In still another embodiment, the lipophilic phenolic acid(s), the surfactant(s), water and the metal source(s) can all be reacted to form a waxy product. This waxy product is separated and dissolved in hydrocarbon followed by the addition of organophosphorus compound(s).

In still another embodiment, the lipophilic phenolic acid(s), the surfactant(s) and the organophosphorus compound(s) may be reacted to form an adduct which is then reacted with the metal source(s) in a hydrocarbon medium.

The present invention also provides a one-pot process for preparation of a hydrocarbon soluble metal composition comprising reacting a metal source, a lipophilic phenolic acid, a surfactant, an organophosphorus compound and water to obtain a reaction product and drying the reaction product to obtain the hydrocarbon soluble metal composition.

In one of the feature of the present invention, the one-pot process for preparation of a hydrocarbon soluble metal composition comprising:

(a) reacting the lipophilic phenolic acid and the metal source in presence of water to form a complex;

(b) reacting the complex with the surfactant in a hydrocarbon medium at a temperature between 50 to 150° C. for a period in the range of 0.5 hour to 6 hours to form a reaction product;

(c) separating an organic phase and aqueous phase of the reaction product and separating the water from the reaction product and drying the reaction product using a solid drying agent to obtain a dried product; and (d) then reacting the dried product with the organophosphorus compound at a temperature between 25 to 50° C. to obtain the hydrocarbon soluble metal composition.

In another feature of the present invention the hydrocarbon is selected from benzene, toluene, xylenes, heptane, decane, dodecane, and petroleum fraction;

wherein the petroleum fraction is selected from kerosene, light cycle oil, and various naphthenic, paraffinic and synthetic diluent oil.

In yet another feature of the present invention the solid drying agent is anhydrous sodium sulfate.

In still another feature of the present invention the entire process is performed in aerobic condition.

In yet another feature of the present invention, the molar stoichiometry of the raw materials used to prepare the hydrocarbon soluble metal composition is:

| | |
|---|---|
| Lipophilic phenolic acid(s) | 1.0 to 3.0 (based on the metal) |
| Surfactant | 0.5 to 1.2 (based on the acid) |
| Organophosphorus compound | 0.1 to 1.5 (based on the metal) |
| Metal Source | 0.5 to 1.5 (based on the acid) |
| Water | 1 to 100.0 (based on the acid) |
| Hydrocarbon | 1 to 100.0 (based on the acid) |

According to the preferred embodiment, an example of a suitable method of preparing hydrocarbon soluble molybdenum compositions is as follows: ammonium heptamolybdate and water are added to the lipophilic phenolic acid and surfactant reaction mass and maintained at approximately 60-100° C. for duration of 1 to 4 hours. At the end of the reaction period the mixture is cooled and the product is removed by filtration. When hydrocarbon solvent is used in the reaction the organic phase is separated from the aqueous phase by decantation and the hydrocarbon solvent is removed by vacuum distillation. The as-formed product is then dried using anhydrous sodium sulfate and reacted with organophosphorus compound at 25-50° C. for duration of 1 to 4 hours. The phosphorus containing hydrocarbon soluble molybdenum compound prepared by this process is a dark blue liquid.

The following examples are given for the purpose of further illustrating the invention. All percentages and parts are based on weight unless otherwise indicated.

EXAMPLE 1

700 g of ammonium hepta molybdate was dissolved in 7000 g of hot water. To that 1100 g of salicylic acid was added and the mixture was heated at 80° C. for 30 min. under stirring. Then 7000 g of toluene was added to the mixture and heated at 80° C. for further 30 min. yielding two separate layers. To this 1400 g of cetyltrimethylammonium bromide was added with vigorous stirring. The organic layer was separated using a separating funnel and dried on solid NaCl powder. To the clear yellow color solution thus obtained was added 104 g of triphenylphosphine under stirring at ambient conditions for 1 h. The resultant dark blue color product contains oil soluble composition with $MoO_3$ concentration of 5.6 wt %.

CHARACTERIZATION OF EXAMPLE 1 COMPOSITION

The 31P NMR chemical shift of the triphenylphosphine and Example 1 composition occurs at −5.01 ppm and at +31.50 ppm, respectively. The XPS analysis of the hydrocarbon soluble Example 1 composition showed two sets of doublets corresponding to 3d5/2 and 3d3/2 orbitals. The doublet at 231.1 and 234.3 eV corresponds to molybdenum in +4 oxidation state. The other set of doublet is observed at 232.4 and 235.5 eV corresponding to molybdenum in +5 oxidation state.

EXAMPLE 2

700 g of ammonium hepta molybdate was dissolved in 7000 g of hot water. To that 1100 g of salicylic acid was added and the mixture was heated at 80° C. for 30 min under stirring. Then 7000 g of toluene was added to the mixture and heated at 80° C. for further 30 min yielding two separate layers. To this 1400 g of cetyltrimethylammonium bromide was added with vigorous stirring. The organic layer was separated using a separating funnel and dried on solid NaCl powder. To the clear yellow color solution thus obtained was added 129 g of triphenyl phosphate under stirring at ambient conditions for 1 h. The resultant dark yellow color product contains oil soluble Example 2 composition with $MoO_3$ concentration of 5.6 wt %.

EXAMPLE 3

700 g of ammonium hepta molybdate, 1100 g of salicylic acid, 1400 g of cetyltrimethylammonium bromide, 104 g triphenylphosphine and 7000 g of water was charged in a reactor and the mixture was heated at 80° C. for 1 hour under stirring. A dark blue color product separates out. The product was filtered and dried in a vacuum oven at a pressure of $10^{-3}$ torr. The thus obtained product contains oil soluble Mo composition with $MoO_3$ concentration of 19.7 wt %.

EXAMPLE 4

700 g of ammonium hepta molybdate was dissolved in 7000 g of hot water. To that 1100 g of salicylic acid was added and the mixture was heated at 80° C. for 30 min under stirring. Then 7000 g of toluene was added to the mixture and heated at 80° C. for further 30 min yielding two separate layers. To this 1400 g of cetyltrimethylammonium bromide was added with vigorous stirring. The organic layer was separated using a separating funnel and dried on solid NaCl powder. To the clear yellow color solution thus obtained was added 110 g of triphenylphosphine oxide under stirring at ambient conditions for 1 h. The resultant dark yellow color product contains oil soluble Example 4 composition with $MoO_3$ concentration of 5.6 wt %.

EXAMPLE 5

700 g of ammonium hepta molybdate was dissolved in 7000 g of hot water. To that 1100 g of salicylic acid was added and the mixture was heated at 80° C. for 30 min under stirring. Then 7000 g of toluene was added to the mixture and heated at 80° C. for further 30 min yielding two separate layers. To this 1400 g of cetyltrimethylammonium bromide was added with vigorous stirring. The organic layer was separated using a separating funnel and dried on solid. NaCl powder. To the clear yellow color solution thus obtained was added 123 g of triphenyl phosphite under stirring at ambient conditions for 1 h. The resultant dark yellow color product contains oil soluble Example 5 composition with $MoO_3$ concentration of 5.6 wt %.

COMPARATIVE EXAMPLE 6

700 g of ammonium hepta molybdate was dissolved in 7000 g of hot water. To that 1100 g of salicylic acid was added and the mixture was heated at 80° C. for 30 min under stirring. Then 7000 g of toluene was added to the mixture and heated at 80° C. for further 30 min yielding two separate layers. To this 140 g of cetyltrimethylammonium bromide was added with vigorous stirring. The organic layer was separated using a separating funnel and dried on solid NaCl powder. The clear yellow color solution thus obtained contains oil soluble Mo composition with $MoO_3$ concentration of 5.6 wt %.

CHARACTERIZATION OF EXAMPLE 6 COMPOSITION

The XPS analysis of the hydrocarbon soluble comparison composition showed only one doublet corresponding to 3d5/2 and 3d3/2 orbitals at 232.6 and 235.7 eV, respectively. This corresponds to molybdenum in 1-5 oxidation state.

EXAMPLE 7

Catalytic Activity Testing

A feed suitable for Slurry Hydrocracking (SHC) is characterized in Table-1. This feed was used to elucidate the efficiency of Example 1 and comparative example 6.

TABLE 1

| Characteristics of Feed stock: | Feed (VR) |
|---|---|
| Properties | |
| Specific gravity, g/cc | 1.020 |
| ICAP Metals (ppm) | |
| Mo | 2.8 |
| Ni | 49 |
| V | 174 |
| Fe | 8.5 |
| CCR | 24.79 |
| S, wt % | 5.4 |
| Total N, ppm | 1400 |
| Heptane insolubles, wt % | 8.55 |

The hydrocracking activity of the Examples 1 and 6 were carried out in a Continuous Stirred Tank Reactor (CSTR). The catalyst precursor prepared according to Examples 1 and 6 were sulfided using 2 wt % sulfiding agent, preferably dimethyldisulfide relative to the feed and catalyst. The mixture is then heated to 230° C. for an hour at 30 bar hydrogen pressure to activate the catalyst before heating the mixture to reaction temperature. In a typical experiment, 300 grams of vacuum residue of Examples 1 and 6 were charged in a 1 liter autoclave with the liquid catalyst between 165 to 660 ppm on metal basis. The autoclave was heated for 120 minutes at 180 bar at operation temperature. Hydrogen was continuously added through a sparger and passed through the reactor continuously at a rate of 350 Standard Litres Per Hour (SLPH) and removed through a back pressure regulator to maintain pressure. The hydrogen stripped out the light products which were condensed in a high pressure separator. Table 2 summarizes the reaction results.

|  | Example-1 | Comparative Example 6 |
| --- | --- | --- |
| Catalyst Concentration (Metal basis), ppm | 165 | 165 |
| Reactor WABT, ° C. | 450 | 450 |
| Pressure, bar | 180 | 180 |
| Residence time, h | 2 | 2 |
| Yield (fresh feed basis) wt % | | |
| Gases | 7.63 | 14.15 |
| Naphtha (C5-440° C.) | 11.04 | 7.52 |
| LGO (140° C.-370° C.) | 53.65 | 53.73 |
| HGO (370° C.-560° C.) | 21.25 | 12.73 |
| UCOO (560° C.+) | 10.48 | 15.44 |
| Pitch/Toluene insoluble | 3.86 | 5.67 |
| Conversion | 89.93 | 85.10 |

The results clearly indicate that the catalyst of Example 1 wherein molybdenum atom is present in reduced oxidation state (+4) showed improved conversion of heavier hydrocarbons and enhanced distillate yield as compared to the comparative example 6 wherein the molybdenum atom is present in higher oxidation state (+5).

Advantages of the Invention

The present invention is having the following technical advantages:
- A new method for making oil/hydrocarbon soluble metal compositions incorporating metals such as Mo, W and V wherein the metals are present in reduced oxidation state (4+) which are known to form highly active $MoS_2$ sites. The invention also provides a simple and convenient synthesis route, using less expensive raw materials.
- A one-pot chemical synthesis route for the preparation of oil/hydrocarbon soluble metal composition wherein the metal composition is formed in a more active reduced oxidation state, without employing any unwieldy high temperature hydrogen reduction step.
- The formation of the metal composition with metal in reduced valance state is scientifically established by the reaction of a metal salt with a lipophilic phenolic acids, surfactants and organophosphorus compounds. The organophosphorous compounds rearrange the chemical environment of the metal complex and reduce metal to lower valency.
- The as-formed oil/hydrocarbon-soluble metal compositions may be used as a catalyst precursor in hydroconversion of heavier hydrocarbons such as vacuum residue.

The invention claimed is:

1. A hydrocarbon soluble metal composition comprising: reaction products of a metal source, a lipophilic phenolic acid, a surfactant, and triphenylphosphine sulfide, triphenylphosphine selenide, triphenylphosphine phenylimide, or a combination thereof, wherein the composition has a formula:

$ML_xQ_yP_z$, wherein
M is a metal source;
L is a ligand selected from the group containing lipophilic phenolic acid;
x ranges from 0.5 to 2;
Q is a surfactant selected from the group containing quaternary ammonium phosphonium salt and combination thereof;
y ranges from 0.5 to 1.5;
P is an organophosphorus compound; and
z ranges from 0.5 to 1.5;
wherein the organophosphorus compound is selected from the group consisting of triphenylphosphine sulfide, triphenylphosphine selenide, triphenylphosphine phenylimide, and combinations thereof.

2. The hydrocarbon soluble metal composition as claimed in claim 1, wherein the metal source is a water-soluble salt of a metal ion capable of reacting with the reaction product of the lipophilic phenolic acid, the surfactant, and triphenylphosphine sulfide, triphenylphosphine selenide, triphenylphosphine phenylimide, or a combination thereof.

3. The hydrocarbon soluble metal composition as claimed in claim 1, wherein the metal source is a salt of a metal selected from the group consisting of vanadium (V), molybdenum (Mo), tungsten (W), and combinations thereof.

4. The hydrocarbon soluble metal composition as claimed in claim 3, wherein the metal is present in a reduced oxidation state of 4+.

5. The hydrocarbon soluble metal composition as claimed in claim 1, wherein the lipophilic phenolic acid is selected from the group consisting of salicylic acid, 1-hydroxy-2-naphthoic acid, 1-hydroxy-2-anthroic acid, 2-hydroxy-3-naphthoic acid, 2-hydroxy-3-anthroic acid, 4-hydroxyisophthalic acid, 2,6-dihydroxybenzoic acid, 5-nitrosalicylic acid, 5-iodosalicylic acid, 5-bromosalicylic acid, 5-iodosalicylic acid, 5-fluorosalicylic acid, 3-chlorosalicylic acid, 4-chlorosalicylic acid, 5-chlorosalicylic acid, and combinations thereof.

6. The hydrocarbon soluble metal composition as claimed in claim 1, wherein the surfactant is selected from the group consisting of monoalkyltrimethylammonium salt, diaikyidimethylammonium salt, trialkylmonomethylammonium salt, cetylpyridinium salt, hexamethylenetetramine chloroallyl chloride, tetraoctylammonium bromide, hexadecyltributylphosphonium bromide, tetraphenylphosphonium chloride, and combinations thereof.

7. A one-pot process for preparation of a hydrocarbon soluble metal composition, the process comprising:
(a) reacting a lipophilic phenolic acid and a metal source in presence of water to form a complex;
(b) reacting the complex with a surfactant in a hydrocarbon medium at a temperature between 50 to 150° C. for a period in a range of 0.5 hour to 6 hours to form a reaction product;
(c) separating the reaction product into an organic phase and an aqueous phase and drying the organic phase using a solid drying agent to obtain a dried product; and
(d) reacting the dried product with triphenylphosphine sulfide, triphenylphosphine selenide, triphenylphosphine phenylimide, or a combination thereof, at a temperature between 25 to 50° C. to obtain the hydrocarbon soluble metal composition.

8. The process as claimed in claim 7, wherein the hydrocarbon is selected from benzene, toluene, xylenes, heptane, decane, dodecane, and petroleum fraction;

wherein the petroleum fraction is selected from kerosene, light cycle oil, and various naphthenic, paraffinic, and synthetic diluent oil.

9. The process as claimed in claim 7, wherein the solid drying agent is anhydrous sodium sulfate.

10. The process as claimed in claim 7, wherein the process is performed in an aerobic condition.

11. The process as claimed in claim 7, wherein the molar stoichiometry of the metal source, lipophilic phenolic acid, surfactant, triphenylphosphine sulfide, triphenylphosphine selenide, triphenylphosphine phenylimide, or a combination thereof, water, and hydrocarbon medium used for preparation of the hydrocarbon soluble metal composition comprises:
   (a) 1.0 to 3.0 moles of the lipophilic phenolic acid (based on the metal source);
   (b) 0.5 to 1.2 moles of the surfactant (based on the lipophilic phenolic acid);
   (c) 0.1 to 1.5 moles of triphenylphosphine sulfide, triphenylphosphine selenide, triphenylphosphine phenylimide, or a combination thereof (based on the metal source);
   (d) 0.5 to 1.5 moles of the metal source (based on the lipophilic phenolic acid);
   (e) 1 to 100.0 moles of water (based on the lipophilic phenolic acid); and
   (f) 1 to 100.0 moles of the hydrocarbon medium (based on the lipophilic phenolic acid).

* * * * *